United States Patent [19]

Sawicki et al.

[11] Patent Number: 4,647,164

[45] Date of Patent: Mar. 3, 1987

[54] APPARATUS FOR AND METHOD OF CORRECTING FOR ASTIGMATISM IN A LIGHT BEAM REFLECTED OFF OF A LIGHT REFLECTING SURFACE

[75] Inventors: Richard H. Sawicki, Pleasanton; William Sweatt, Livermore, both of Calif.

[73] Assignee: The United States of America as represented by the United States Department of Energy, Washington, D.C.

[21] Appl. No.: 800,631

[22] Filed: Nov. 21, 1985

[51] Int. Cl.⁴ .......................... G02B 5/10; G02B 7/18
[52] U.S. Cl. ..................................... 350/611; 350/607
[58] Field of Search ............... 350/611, 608, 607, 609, 350/360

[56] References Cited

U.S. PATENT DOCUMENTS 3,063,671  9/1971  Brown ................................. 350/611

OTHER PUBLICATIONS

K. M. Harrison, "A Method of Radially Supporting Large Mirrors", *J. Br. Astron. Assoc.*, (U.K. 1977,87,2), pp. 154–159.

Primary Examiner—Jon W. Henry
Attorney, Agent, or Firm—P. Martin Simpson, Jr.; L. E. Carnahan; Judson R. Hightower

[57] ABSTRACT

A technique for adjustably correcting for astigmatism in a light beam is disclosed herein. This technique utilizes first means which defines a flat, rectangular light reflecting surface having opposite reinforced side edges and which is resiliently bendable, to a limited extent, into different concave and/or convex cylindrical curvatures about a particular axis and second means acting on the first means for adjustably bending the light reflecting surface into a particular selected one of the different curvatures depending upon the astigmatism to be corrected for and for fixedly maintaining the curvature selected. In the embodiment disclosed, the light reflecting surface is adjustably bendable into the selected cylindrical curvature by application of a particular bending moment to the reinforced side edges of the light reflecting surface.

17 Claims, 10 Drawing Figures

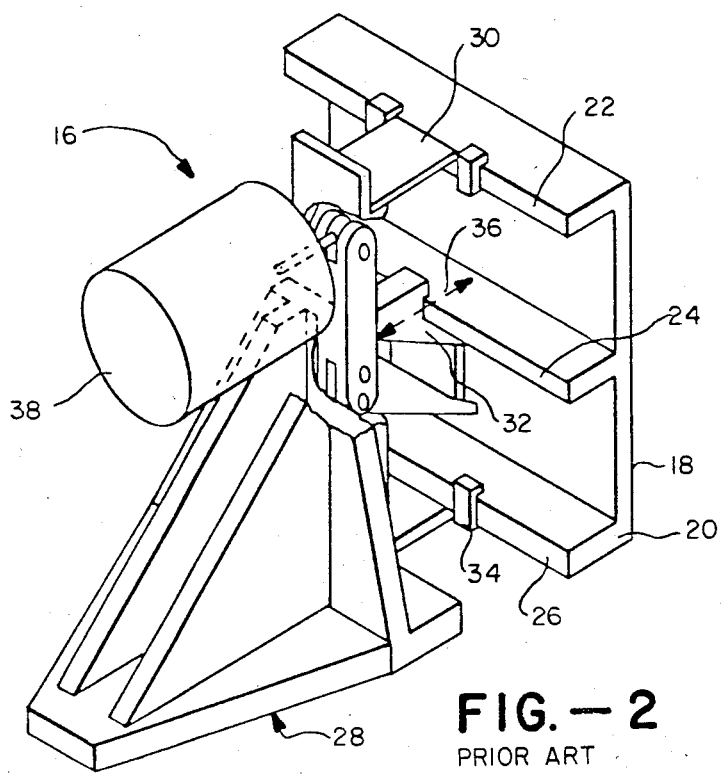
FIG.—2
PRIOR ART
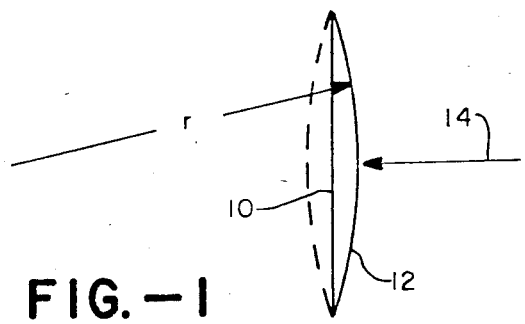
FIG.—1
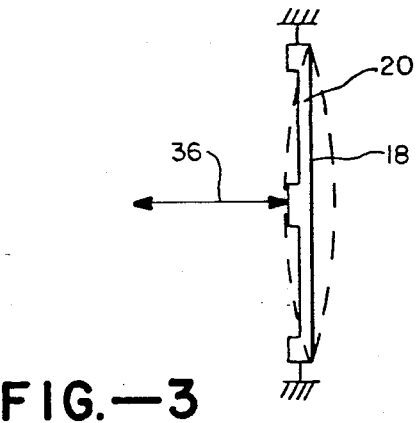
FIG.—3
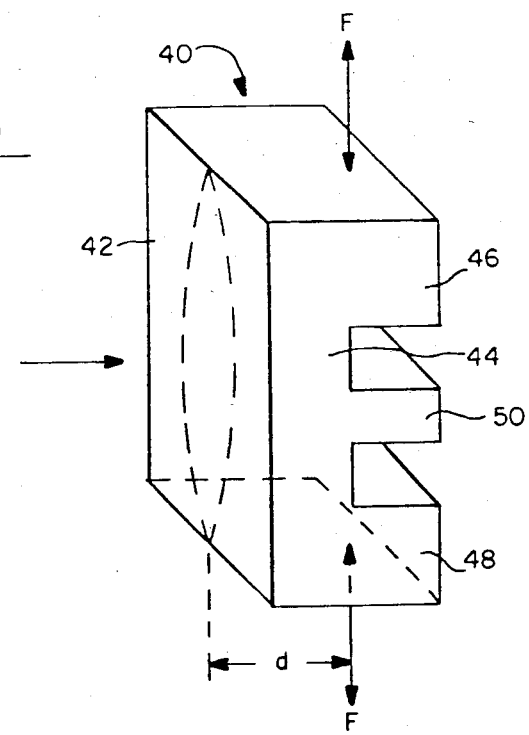
FIG.—4

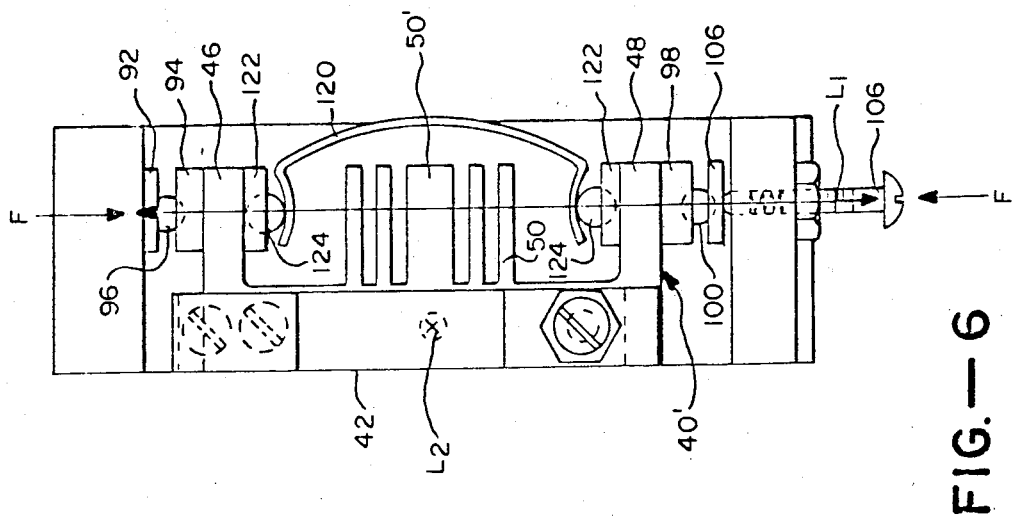
FIG.—6
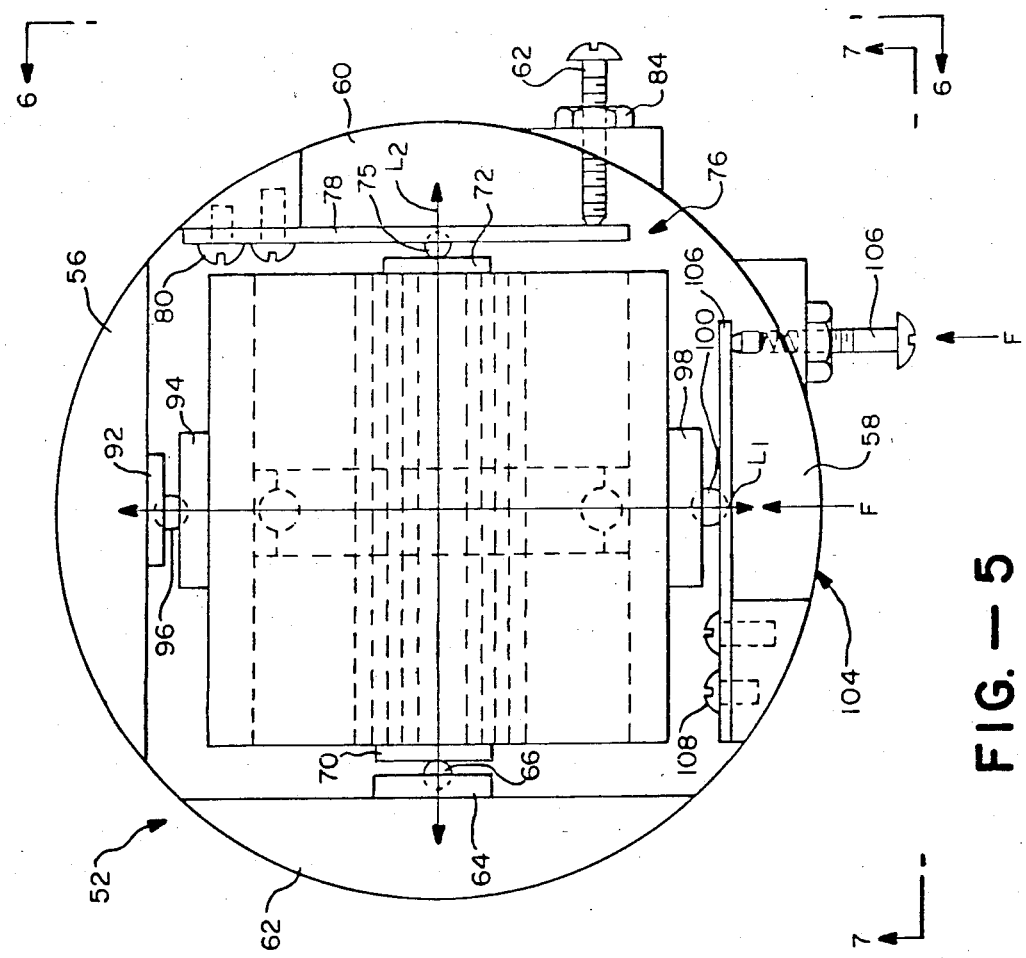
FIG.—5

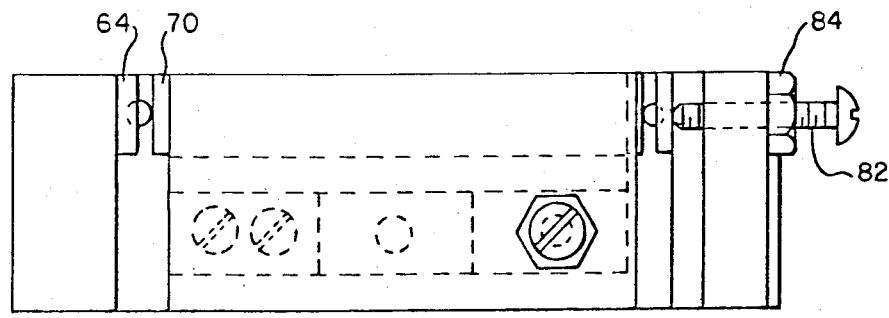
FIG. —7
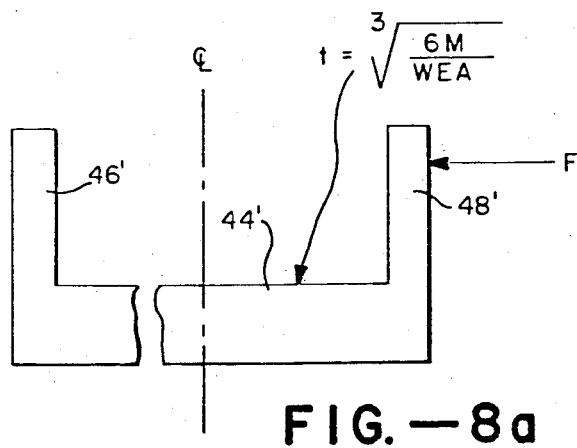
FIG. —8a
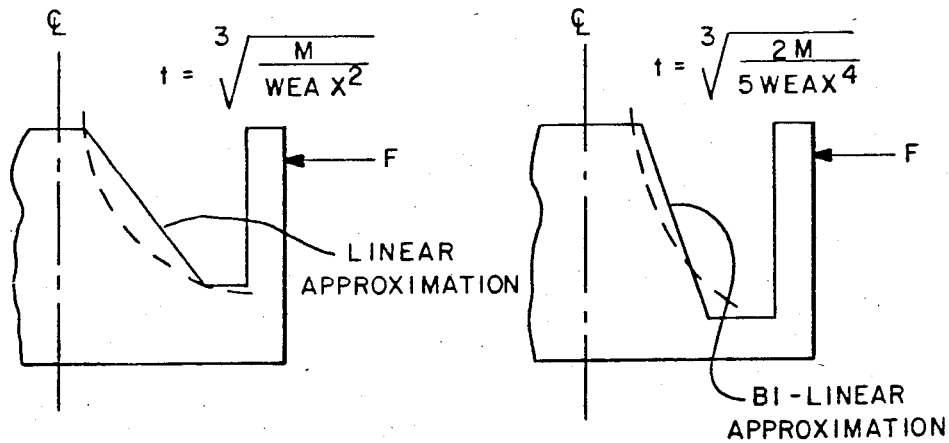
FIG. —8b FIG. —8c

APPARATUS FOR AND METHOD OF CORRECTING FOR ASTIGMATISM IN A LIGHT BEAM REFLECTED OFF OF A LIGHT REFLECTING SURFACE

FIELD OF THE INVENTION

The United States Government has rights in this invention pursuant to contract number W-7405-ENG-48 between the United States Department of Energy and the University of California for the operation of the Lawrence Livermore National Laboratory

BACKGROUND OF THE INVENTION

The present invention relates generally to techniques for bending planar surfaces and more particularly to a specific technique for correcting for astigmatism in a light beam reflected off of a light reflecting surface by adjustably bending the surface in a selected manner.

It is not uncommon for astigmatism to develop in a light beam passing through an optical system. A known way to correct for this astigmatism is to reflect the beam off of a mirrored surface which has a slight convex or concave cylindrical configuration in the appropriate direction relative to the incident axis of the beam's astigmatism. The degree of curvature depends upon the amount of astigmatism in the beam. FIG. 1 illustrates means 10 defining a cylindrical light reflecting surface 12 having a radius of curvature r. The axis of the cylinder including surface 12 extends normal to the axis of the incident beam 14 (into the plane of the paper). The degree of curvature of surface 12, that is, the size of radius r, and whether the surface is convex relative to the incoming beam as illustrated by solid lines or concave (as shown by dotted lines), depends upon the amount of astigmatism in beam 14 which is to be corrected (if at all). If the beam displays no astigmatism at all, surface 12 would be entirely flat.

The discussion of FIG. 1 immediately above assumes that the astigmatism in beam 14 could be predetermined. As a result, means 10 defines a fixed surface 12. In some cases, it is not possible to predetermine the astigmatism to be corrected for and therefore it is not possible to provide the appropriately curved light reflecting surface ahead of time. In FIG. 2 there is illustrated an apparatus generally indicated by the reference numeral 16 for adjustably bending a light reflecting surface 18 into a particular cylindrical shape whose radius can be selected depending upon the astigmatism to be corrected. As seen in FIG. 2, the surface 18 is defined by a bendable plate like member 20 including rearwardly extending spaced-apart ribs 22, 24 and 26. The apparatus also includes a mechanism 28 including gripping members 30, 32 and 34 for gripping ribs 22, 24, and 26, respectively, in order to support the overall plate like member in the position illustrated. The upper and lower gripping members 30 and 34 are fixed and therefore retain the ribs 22 and 26, and therefore the upper and lower edges of surface 18, in fixed positions. At the same time, gripping member 32 is movable back and forth, to a limited extent, in the direction of two way arrow 36, that is, normal to surface 18 and along a line through the center of the light reflecting surface. Means including the motor 38 or any other suitable drive mechanism is provided for moving the gripping member 32 in the manner just recited, in a controlled fashion, in order to bend surface 18 to a desired curvature depending upon the amount of astigmatism of the light beam being reflected off of surface 18. FIG. 3 diagrammatically illustrates the way in which plate 20 is acted upon in order to bend surface 18.

The overall apparatus 16 just described is known in the art. While such an apparatus provides an in line technique for adjusting the curvature of a light reflecting surface for astigmatism, the push-pull approach utilized does not result in a purely cylindrical shape that is, in mathematical terms, proportionate to $X^2$ (for small curvatures) where X is measured perpendicular to the cylinder's axis in the plane of the reflecting surface. Rather, the push-pull action at the center of the surface to be bent, as in the apparatus illustrated in FIG. 2, produces a sizeable term, generally proportionate to $|X|^3$ which, of course, is not cylindrical at all. In addition the loading technique produces some random warping because the loading is not determinate when the deflections are small ('1 micron).

A second type of device for adjusting the curvature of a light reflecting surface is described in an article entitled "three-actuator deformable water-cooled mirror" by Anthony Fuschetto the Perkin-Elmer Corporation published in OPTICAL ENGINEERING/March/April 1981/Vol. 20. No. 2. The device described there uses three piezoelectric stacks connected to six distinct points along the edges of a circular mirror. Each of these stacks applies a force between an associated pair of these points, generally parallel to the mirrored surface, thereby applying a bending moment to the mirror for bending the latter.

The Fuschetto approach just described is a more accurate way to obtain a cylindrical contour on a mirror for correcting for astigmatism than the approach illustrated in FIGS. 2 and 3. However, even the Fuschetto design does not provide for accurately uniformly contouring the mirrored surface along its entire extent. A primary reason for this is that the mirrored surface is arcuate (circular) and each piezoelectric stack concentrates its application of force to distinct points on the edge of the mirrored surface.

SUMMARY OF THE INVENTION

In view of the foregoing, it is an object of the present invention to provide a technique for adjustably bending a light reflecting surface, to a limited extent, into varying amounts ot truly cylindrical curvatures.

A more particular object of the present invention is to provide an in-line apparatus for correcting for astigmatism in a light beam reflected off of a light reflecting surface utilizing the technique recited immediately above.

Another particular object of the present invention is to provide an uncomplicated and yet reliable apparatus which can be designed for adjustably bending a light reflecting surface into a cylindrical-like curvature proportionate to $X^2$, $X^4$, $X^6$ or $X^{2n}$ where X is measured along the bending axis of the surface and n is a positive integer of reasonable size.

Still another particular object of the present invention is to provide an apparatus which relys on a bending moment (as contrasted with a "push and pull" type motion) to adjustably bend a light reflecting surface into cylindrical curvatures but which is an improvement over the approach described in the above-discussed Fuschetto publication.

As will be seen hereinafter, the overall technique disclosed herein for correcting for astigmatism in a light beam utilizes first means defining a flat rectangular (for example square) light reflecting surface which defines distinct reinforced site edges and which is resiliently bendable, to a limited extent, into different concave and/or convex cylindrical curvatures about a particular axis and second means acting on the reinforced side edges of the first means for adjustably bending the light reflecting surface into a particular selected one of the different cylindrical curvatures depending upon the astigmatism to be corrected for and for fixedly maintaining the curvature selected. The reinforced side edges of the first means are configured so that when they are acted upon by the second means in a particular way the light reflecting surface is adjustably bent into the selected curvature by the application of a specific bending moment to the first means with respect to the surface depending upon the curvature desired.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The technique just recited briefly will be described in more detail hereinafter in conjunction with the drawings wherein:

FIG. 1 is a cross-sectional view of means defining a fixed light reflecting surface which illustrates how the light reflecting surface corrects for an astigmatism in a light beam reflected off of that surface;

FIG. 2 is a perspective view of an apparatus of the prior art for correcting for astigmatisms in a light beam using an adjustably bendable light reflecting surface;

FIG. 3 diagrammatically illustrates how the apparatus of FIG. 2 operates;

FIG. 4 is a perspective view of a member which defines a light reflecting surface and which forms part of an overall apparatus designed in accordance with the present invention for correcting for astigmatism in a light beam reflected off of a light reflecting surface defined by the member;

FIG. 5 is a frontal plan view of the overall apparatus referred to immediately above, that is, the apparatus designed in accordance with the present invention for correcting for astigmatism in a light beam reflected off of a light reflecting surface;

FIG. 6 is a side sectional view of the apparatus of FIG. 5, taken generally along line 6—6 in FIG. 5;

FIG. 7 is a plan view of the underside of the apparatus of FIG. 5, taken generally along line 7—7 in FIG. 5; and FIGS. 8a, 8b, and 8c are diagrammatic illustrations of sections of members corresponding the the member of FIG. 4 which provide different bending characteristics depending upon the particular design of each member.

DETAILED DESCRIPTION OF THE INVENTION

Reference will now be made in detail to preferred embodiments of the invention, examples of which are illustrated in the accompanying drawings. While the invention will be described in connection with these preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to the drawings, wherein like components are designated by like reference numerals throughout the various Figures, attention is immediately directed to FIG. 4, since FIGS. 1-3 were discussed previously. There is illustrated in FIG. 4 an integrally formed generally E-shaped body member 40 having a front face 42 defining a flat rectangular light reflecting surface. As seen in FIG. 4, this light reflecting surface is part of a plate-like main segment 44 of the body which is disposed in front of a pair of upper and lower, rearwardly extending flange segments 46 and 48 which may also be referred to as reinforced side edges and an intermediate flange segment 50. The entire integrally formed member may be constructed of any suitable material which is capable of defining light reflecting surface 42 and which, at the same time, is resiliently bendable, to a limited extent, for the reasons to be described. In an actual working embodiment, the overall member is constructed of low expansion glass configured to define a mirrored surface 42.

Overall member 40 is designed in accordance with the present invention so that light reflecting surface 42 can be adjustably bent into any selected one of a number of different concave and/or convex cylindrical curvatures about a particular axis extending parallel to flange segments 46, 48 and 50 in a plane equidistant from the top and bottom of the light reflecting surface. In a most preferred embodiment of the present invention, member 40 is designed to have the configuration just described so that light reflecting surface 42 can be adjustably bent into a selected cylindrical curvature by applying a corresponding bending moment to the member in a particular way to be described hereinafter. As illustrated in FIG. 4, such a bending moment can be achieved by pushing the two flanges 46 and 48 toward one another or by pulling these components apart at particular points thereon. This is indicated by the two-way force vectors F fixed distances d from the surface 42. Thus, when the flanges 46 and 48 are pushed towards one another, the mirrored surface 42 is caused to bend into a selected convex cylindrical curvature. If the flanges 46 and 48 are pulled apart, the light reflecting surface is caused to adjustably bend into a particular concave cylindrical surface. The radius of curvature of the ultimately bent surface depends upon the degree to which flanges 46 and 48 are pushed towards or pulled away from one another. The forces applied do not create any transverse loads, that is loads perpendicular to surface 42. It is the absence of these loads that permits the generation of the curvature which is proportionate to $X^2$. Also, it should be noted that the pulling and pushing forces are applied to specific points on flanges 46 and 48. However, because of these flanges or reinforced edges, the forces are applied uniformly across the entire edges defined by the flanges.

The discussion immediately above has been a description of how light reflecting surface 42 can be bent into a true cylindrical curvature about a particular axis by application of a cooperating bending moment. Under these circumstances, that is, when a surface is caused to bend about one axis, there is a tendency for the same surface to want to bend the opposite way about a perpendicular axis. This is referred to as anticlastic bending. In order to prevent or at least minimize this from occurring to surface 42 when it is caused to bend in the desired manner, overall body member 40 includes the intermediate flange segment 50 which serves as a reinforcing rib. Thus, as the surface 42 is caused to bend about an axis parallel to segment 50 (the desired bending axis), the latter segment aids in preventing the surface from anticlastically bending about an axis normal to the desired axis.

Turning now to FIGS. 5-7, attention is directed to an overall apparatus 52 designed in accordance with the present invention for correcting for astigmatism in a light beam reflected off of a light reflecting surface. This apparatus is shown including a member 40' which may be identical to previously described member 40, with one exception. Rather than having a solid reinforcing rib 50, as in member 40, member 40' includes a series of thinner spaced-apart ribs 50'. Otherwise, member 40' includes the same mirrored surface 42, plate-like main segment 44 and upper and lower flange segments 46 and 48, as best illustrated in FIG. 6. Member 40' is held within an overall outer frame arrangement generally indicated as 54. This frame arrangement includes upper and lower frame sections 56 and 58, respectively, and opposing side frames 60 and 62. As will be seen below, member 40' is supported within these frame sections at four points, namely a pair of upper and lower points and a pair of opposing side points. The upper and lower points are located along a vertical line centrally located between the sides of the member through flanges 46 and 48 a distance d (see FIG. 4) from surface 42 and the pair of side points are located on a horizontal line which may or may not be equidistant from the top and bottom of member 40' but which is located forwardly of the vertical line just mentioned. The vertical line is illustrated in FIG. 6 at L1 and the horizontal line is illustrated in FIGS. 5 and 6 at L2.

As best illustrated in FIG. 5, frame section 62 includes a pad 64 which defines a conical socket for containing a ball 66. At the same time, the side 68 of member 40' facing frame section 62 includes a cooperating flat pad 70. A similar pad 72 is located on the opposite side 74 of member 40'. Both the pads 70 and 72 and the pad 64 are positioned to contain line L2 with the ball 66 making contact with pad 70 on that line. In a similar manner, a second ball 75 is lightly forced against pad 72 on line L2 by means of a cantilever mechanism generally indicated at 76. This arrangement includes a cantilever beam 78 fixedly connected at one end by suitable bolt means 80. The other end of the cantilever beam is adjustably pushed inward by means of bolt 82 and cooperating threads machined into side frame 60. The inside surface of beam 78 includes a conical socket for containing the ball 75. By applying even a small amount of force against member 40' at the ball points 66, 75, the entire member is prevented from rotating about the vertical line L1 when the light reflecting surface 42 is adjustably bent in the manner to be described below.

Still referring to FIGS. 5-7, frame section 56 and the top side 90 of member 40 are shown including cooperating pads 92 and 94 and a cooperating ball 96 similar to the pads 64 and 70 and ball 66. However, it should be noted that the pad 94, like the pad 92 includes its own conical socket. Also, it should be noted that the ball 96 is located on line L1. A similar pad 98 and cooperating ball 100 are located on the lower side 102 of member 40' such that the ball 100 is also located on line L1. This latter ball is held in place by means of a second cantilever mechanism 104 which includes a cantilever beam 106 fixedly connected at one end by bolt means 108. The other end is made adjustably movable toward and away from member 40' by means of screw and spring arrangement 106. The inside surface of cantilever beam 106, like beam 78, includes its own conical socket for containing ball 100. Thus, it should be apparent that by forcing the cantilever beam 106 toward member 40', the flanges 46 and 48 are pushed toward one another, in the manner described with respect to FIG. 4, thereby resulting in the bending moment necessary to cause surface 42 to bend into a desired convex cylindrical curvature.

The cantilever mechanism 106 is capable of applying a positive force against flange 48 of member 40' in order to cause flange 48 and flange 46 to be pushed towards one another. However, mechanism 104 is not capable by itself of causing the flanges 46 and 48 to be pulled apart in the manner described with respect to FIG. 4. However, to this end, the overall apparatus includes a preload spring 120 (see FIG. 6) which cooperates with its own pads 122 and cooperating balls 124 located inside flanges 46 and 48 on line L1. The preload spring is designed to act on member 40' so as to bend surface 42 into a maximum desired concave curvature, without any application of force by cantilever mechanism 104. In other words, the surface 42 is biased into a maximum concave curvature by means of preload spring 120. As a result, the mechanism 104 can be used to push the flanges 46 and 48 toward one another in order to make the surface 42 less concave, eventually truly flat, or convex (in a cylindrically curved manner) or mechanism 104 can be adjusted to allow the preload spring to force surface 42 back towards its maximum concave configuration. In any event, as the surface 42 is caused to bend in a concave or convex manner, the balls 66 and 75 prevent the overall member 40' from rotating about line L1 or any other vertical axis.

As described above, overall apparatus 52 was described including a member 40' configured such that, upon application of the appropriate bending moment to the member, light reflecting surface 42 would bend to a cylindrical curvature, specifically a curvature proportional to $X^2$ where X was measured along the length of the curved surface. By designing the overall member 40' in different specific ways, it is possible to cause the light reflecting surface to bend to curvatures proportional to $X^4$, $X^6$ or $X^{2n}$ generally. This may be accomplished by designing the member in accordance with the following beam bending equations that approximate the plate response of the two dimensional mirror:

$$M = EI(d^2y/dx^2) \tag{1}$$

$$y = Ax^n \tag{2}$$

$$I = 1/12wt^3 \tag{3}$$

In the equations just recited: y corresponds to deflection: M corresponds to the bending moment: E corresponds to the modulus of elasticity of the material making up member 40': I corresponds to the bending moment of inertia: t is thickness of member 40' and w= is the width of member 40'. FIGS. 8a, 8b, and 8c illustrate three different configurations for a member corresponding to members 40 and 40' in order to provide second order, fourth order and sixth order curvatures, respectively. Note that in all three cases, the inforcing rib, if any, has not been shown. It is to be understood that the configurations illustrated have been derived utilizing the equations recited above and individuals with skill in the art based on the teachings herein could readily provide the designs illustrated.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were shown and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. An apparatus for correcting for astigmatism in a light beam reflected off of a light reflecting surface, comprising:
   (a) first means defining a flat, rectangular light reflecting surface which is resiliently bendable, to a limited extent, into different concave and/or convex cylindrical curvatures about a particular axis, said first means being configured so that said light reflecting surface can be adjustably bent into said selected cylindrical curvature by applying a particular bending moment to said first means with respect to said surface, depending upon the curvature desired, said first means including an integrally formed body member having a main plate-like segment including a front face defining said light reflecting surface and a pair of spaced-apart flange segments extending rearwardly of said main segment; and
   (b) second means acting on said first means for adjustably bending said light reflecting surface into a particular selected one of said different cylindrical curvatures, depending upon the astigmatism to be corrected for, and for fixedly maintaining the curvature selected, said second means including means for applying said bending moment to said first means, said means for applying said bending moment to said first means including means for applying specific forces to said flange segments at predetermined points on said flange segment fixed distances rearwardly of the front face of said main segment, whereby to produce said bending moment.

2. An apparatus according to claim 1 wherein said means for applying specific forces to said flange segments at said specific points includes first means for applying a variable force to one of said flange segments at its specific point in the direction of the other flange segment and second means engaging the other of said flange segments at its specific point so as to prevent said other flange segment from moving in response to said variable force, whereby the application of said variable force produces said bending moment.

3. An apparatus according to claim 2 wherein said means for applying said variable force includes a cantilever arrangement mechanism including a cantilever beam fixed at one end thereof, means for moving said cantilever beam to various different positions at an adjusting point thereon a predetermined distance from its fixed end and force engagement means located between the fixed end of said cantilever beam and said adjustment point and cooperating with said beam for applying said variable force to said one flange segment depending on the position of said cantilever beam.

4. An apparatus according to claim 3 wherein said force engaging means includes a conical socket and wherein said second means engaging said other flange includes a conical socket.

5. An apparatus according to claim 4 including means for preventing said body member from pivoting about the axis collinear with said applied forces.

6. An apparatus according to claim 5 wherein said flange segments are elongated and extend parallel to said first mentioned axis and wherein said body member includes at least one intermediate elongated flange segment extending rearwardly from said main segment between said first-mentioned flange segments.

7. An apparatus according to claim 6 wherein said body member includes a plurality of said intermediate flange segments.

8. An apparatus according to claim 1 wherein said integrally formed body is constructed of low thermal expansion glass.

9. An apparatus according to claim 2 wherein said means for applying specific forces to said flange segments at said specific points includes spring means disposed between said flange segments for producing said bending moment so as to cause the curvature of said light reflecting surface to be concave if said variable force is below a fixed value and wherein the application of said variable force above said fixed value produces a bending moment which causes the curvature of said surface to be convex.

10. An apparatus for correcting for astigmatism in a light beam reflected off of a light reflecting surface, comprising:
   (a) first means defining a flat, rectangular light reflecting surface which defines one pair of opposite edges and reinforcing flanges extending the entire lengths of said edges and which is resiliently bendable, to a limited extent, into different concave and/or convex curvatures about a particular axis; and
   (b) second means acting on said opposite edges of said first means for adjustably bending said light reflecting surface into a particular selected one of said different curvatures depending upon the astigmatism to be corrected for and for fixedly maintaining the curvature selected;
   (c) said first means being configured so that when said first means acts on said opposite edges it causes said light reflecting surface to be adjustably bent into said selected curvature by applying to said first means a particular bending moment with respect to said surface, depending upon the curvature desired.

11. An apparatus according to claim 10 wherein said first means defining said flat light reflecting surface is configured so that the application of said particular bending moment to said first means causes said surface to bend into a second order curvature.

12. An apparatus according to claim 10 wherein said first means defining said flat light reflecting surface is configured so that the application of said particular bending moment to said first means causes said surface to bend into a fourth order curvature.

13. An apparatus according to claim 10 wherein said first means defining said flat light reflecting surface is configured so that the application of said particular bending moment to said first means causes said surface to bend into a sixth order curvature.

14. An apparatus for use with means defining a flat, rectangular surface which defines a pair of opposite reinforced edges and which is resiliently bendable, to a limited extent, into different concave and/or convex curvatures about a particular axis, said apparatus comprising means acting on said reinforced edges of said first mentioned means for adjustably bending said light reflecting surface into a particular selected one of said different curvatures and for fixedly maintaining the curvature selected, said first mentioned means being configured so that when said first means acts on said opposite edges it causes said flat surface to be adjustably bent into said selected curvature by applying a particular bending moment to said first mentioned means with respect to said surface, depending upon the curvature desired.

15. A method for correcting for astigmatism in a light beam reflected off of a light reflecting surface, comprising:
    (a) providing means defining a flat, rectangular light reflecting surface which defines a pair of opposite reinforced edges and which is resiliently bendable, to a limited extent, into different concave and/or convex curvatures about a particular axis; and
    (b) acting on said reinforced side edges of said means defining said flat light reflecting surface for adjustably bending said light reflecting surface into a particular selected one of said different curvatures depending upon the astigmatism to be corrected, and fixedly maintaining the curvature selected;
    (c) said means defining said flat light reflecting surface being configured so that when said first means acts on said opposite edges it causes said light reflecting surface to be adjustably bent into said selected curvature by applying a particular bending moment to said light reflecting surface with respect to said surface depending upon the curvature desired.

16. An apparatus for correcting for astigmatism in a light beam reflected off of a light reflecting surface, comprising:
    (a) first means defining a flat, rectangular light reflecting surface which includes a pair of opposite reinforced edges and which is resiliently bendable, to a limited extent, into different concave and/or convex cylindrical curvatures about a particular axis; and
    (b) second means applying forces on said opposite side edges in a direction generally parallel to said surface whereby to apply a bending moment to said first means for adjustably bending said light reflecting surface into a particular selected one of said different cylindrical curvatures, depending upon the astigmatism to be corrected for, and for fixedly maintaining the curvature selected.

17. An apparatus according to claim 16 wherein said first means includes a reinforcement flange parallel with and located between said reinforced side edges.

* * * * *